US012326299B2

(12) United States Patent
Zaiser et al.

(10) Patent No.: US 12,326,299 B2
(45) Date of Patent: Jun. 10, 2025

(54) SANITARY DIRECT CONTACT STEAM INJECTION HEATER

(71) Applicant: Hydro-Thermal Corporation, Waukesha, WI (US)

(72) Inventors: James C. Zaiser, Elm Grove, WI (US); Robert Bourdo, II, Pewaukee, WI (US); Justin Widiker, Burlington, WI (US)

(73) Assignee: Hydro-Thermal Corporation, Waukesha, WI (US)

( * ) Notice: Subject to any disclaimer, the term of this patent is extended or adjusted under 35 U.S.C. 154(b) by 156 days.

(21) Appl. No.: 17/857,430

(22) Filed: Jul. 5, 2022

(65) Prior Publication Data

US 2024/0011711 A1 Jan. 11, 2024

(51) Int. Cl.

*F28C 3/08* (2006.01)
*B01F 23/232* (2022.01)
*B01F 23/237* (2022.01)
*B01F 25/314* (2022.01)
*B01F 35/30* (2022.01)

(52) U.S. Cl.

CPC .............. *F28C 3/08* (2013.01); *B01F 23/232* (2022.01); *B01F 23/23767* (2022.01); *B01F 25/31432* (2022.01); *B01F 2035/351* (2022.01); *B01F 2035/352* (2022.01)

(58) Field of Classification Search

CPC .............. B01F 23/232; B01F 23/23767; B01F 25/31432; B01F 2035/351; B01F 2035/352; F28C 3/08

USPC .................................................. 261/DIG. 10

See application file for complete search history.

(56) References Cited

U.S. PATENT DOCUMENTS

| | | | | |
|---|---|---|---|---|
| 4,773,827 | A | 9/1988 | Zaiser | |
| 5,395,569 | A * | 3/1995 | Badertscher | B01F 23/2321 261/76 |
| 5,622,655 | A | 4/1997 | Cincotta et al. | |
| 5,743,638 | A * | 4/1998 | Cummins | F28C 3/08 366/150.1 |
| 5,842,497 | A | 12/1998 | Drifka et al. | |
| 6,082,712 | A * | 7/2000 | Cincotta | B01F 25/3122 261/76 |
| 6,361,025 | B1 * | 3/2002 | Cincotta | B01F 25/313 261/DIG. 78 |
| 8,167,278 | B2 | 5/2012 | Cincotta | |
| 9,377,243 | B2 * | 6/2016 | Cincotta | F28C 3/08 |
| 10,674,751 | B1 | 6/2020 | Roth | |

* cited by examiner

*Primary Examiner* — Charles S Bushey

(74) *Attorney, Agent, or Firm* — Andrus Intellectual Property Law, LLP

(57) ABSTRACT

A direct contact steam injection heater that allows shear to be adjusted by modifying a lateral position of a movable combining tube. The movable combining tube includes a rack on an outer surface of the combining tube that engages a movable lever arm of an adjustment mechanism. The pivoting movement of the lever arm moves the combining tube in a lateral direction to adjust the shear in the product being heated. The combining tube is supported in a housing by a pair of lateral bushings and a pair of end seals prevent product from entering the combining tube housing. The lever arm is coupled to a worm gear shaft such that rotation of the worm gear shaft creates pivoting movement of the lever arm and lateral movement of the combining tube.

16 Claims, 7 Drawing Sheets

SANITARY DIRECT CONTACT STEAM INJECTION HEATER

BACKGROUND

The present disclosure relates to direct contact steam injection heaters that provide adjustable shear for a liquid or slurry product flowing through the heater. More specifically, the present disclosure relates to an adjustable combining tube that is laterally movable within a housing to adjust the shear while providing a sanitary environment.

In direct contact steam injection heaters, steam is directly mixed with a liquid or slurry product to heat the product. Direct contact steam injection heaters are very effective at transferring heat energy from steam to liquid or slurry products. The heaters provide rapid heat transfer with virtually no heat loss to the atmosphere, and also transfer both the latent and available sensible heat of the steam to the product.

One type of commercially available direct contact steam injection heater, as shown in U.S. Pat. No. 5,842,497 and provided by the assignee of the present invention under the HydroHeater name, has an adjustable combining tube that restricts product flow into the heater and adjusts shear on the product flowing through the heater. This prior art direct contact steam injection heater has a heater body having a steam inlet, a product inlet, and an outlet for the heated product. A steam nozzle is located within the body downstream of the steam inlet. A longitudinal combining tube is slidably mounted in the heater body between the steam nozzle and the heater outlet. The combining tube has an upstream end that is spaced away from the steam nozzle a variable distance to form a passage from the product inlet into the combining tube. The position of the combining tube is maintained by a combining tube stud that is mounted to the combining tube. It can be important, particularly for cooking starch, to adjust the combining tube up or down so that the product has proper velocity and thickness when the steam from the nozzle impinges the product. In many applications, there is an optimum setting for the distance between the steam nozzle and the upstream end of the combining tube. The optimum setting often varies depending on flow rates, temperatures and composition of the product.

The above-described prior art direct contact steam injection heater includes several areas, including the combining tube stud, that allow liquid and the food product to become trapped during use. If the direct contact stem injection heater is used in a sanitary environment, such as in the preparation of food products, it is desirable to have a heater that is easier to clean and has less areas for food products to become trapped. Further, it is desirable for the adjustment mechanism for the combining tube is sealed to prevent food products from entering into the adjustment mechanism.

SUMMARY

The present disclosure is directed to a direct contact steam injection heater in which the position of the combining tube, and thus the shear on the liquid or slurry product flow can be adjusted. The disclosure is directed to a steam injection heater that is particularly useful in sanitary applications that require cleaning and sealed environments within the heater.

The direct contact steam injection heater includes a supply body that has a steam inlet, a product inlet and a steam nozzle that is located along a center axis and includes a movable stem plug to control the flow of steam into the product flow. A combining tube is positioned downstream from the steam nozzle to receive the product flow and the steam to allow the steam and product flow to mix and heat the product flow to a desired temperature before exiting the heater at a discharge end of the steam injection heater.

The combining tube is mounted for linear movement along the center axis within a combining tube housing. The combining tube is movable in a linear direction along the center axis toward and away from the steam nozzle to control the amount of product that flows into the combining tube from the product inlet. In one contemplated embodiment of the present disclosure, a pair of linear bearings are positioned between the combining tube and the combining tube housing to allow the linear movement of the combining tube.

The direct contact steam injection heater includes a combining tube adjustment mechanism that engages an outer surface of the combining tube such that operation of the adjustment mechanism moves the combining tube in the linear direction toward or away from the steam nozzle. In one exemplary embodiment of the present disclosure, the combining tube adjustment mechanism includes a lever arm that is pivotable within a housing attached to the combining tube housing. The pivoting movement of the lever arm engages the combining tube to create the linear movement of the combining tube.

In one contemplated embodiment, the outer surface of the combining tube includes a rack having a series of spaced teeth. The lever arm includes a second end that also includes a series of teeth that mesh with the teeth on the combining tube. The pivoting movement of the lever arm results in the meshed teeth moving the combining tube in a linear direction. In one contemplated embodiment, a first end of the lever arm includes a drive surface having a series of teeth that engage a drive shaft that is notably driven by a drive motor. As the drive shaft rotates, a helical flight of a worm gear portion engages the teeth on the drive surface to cause the lever arm to pivot. The pivoting movement of the lever arm results in the linear movement of the combining tube.

In one contemplated embodiment, a first sanitary seal assembly is positioned between the inlet end of the combining tube housing and the outer surface of the combining tube to prevent the product from entering into the gap between the combining tube and the combining tube housing. A second sanitary seal assembly is positioned between the outlet end of the combining tube housing and the outer surface of the combining tube to further seal the air gap between the combining tube and the combining tube housing. Both the first and second sanitary seal assemblies are formed from a main body and a bias member. The bias member is received within a cavity formed between an inner wall and an outer lip. The bias member creates a sealing force during use of the sanitary seal assembly.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
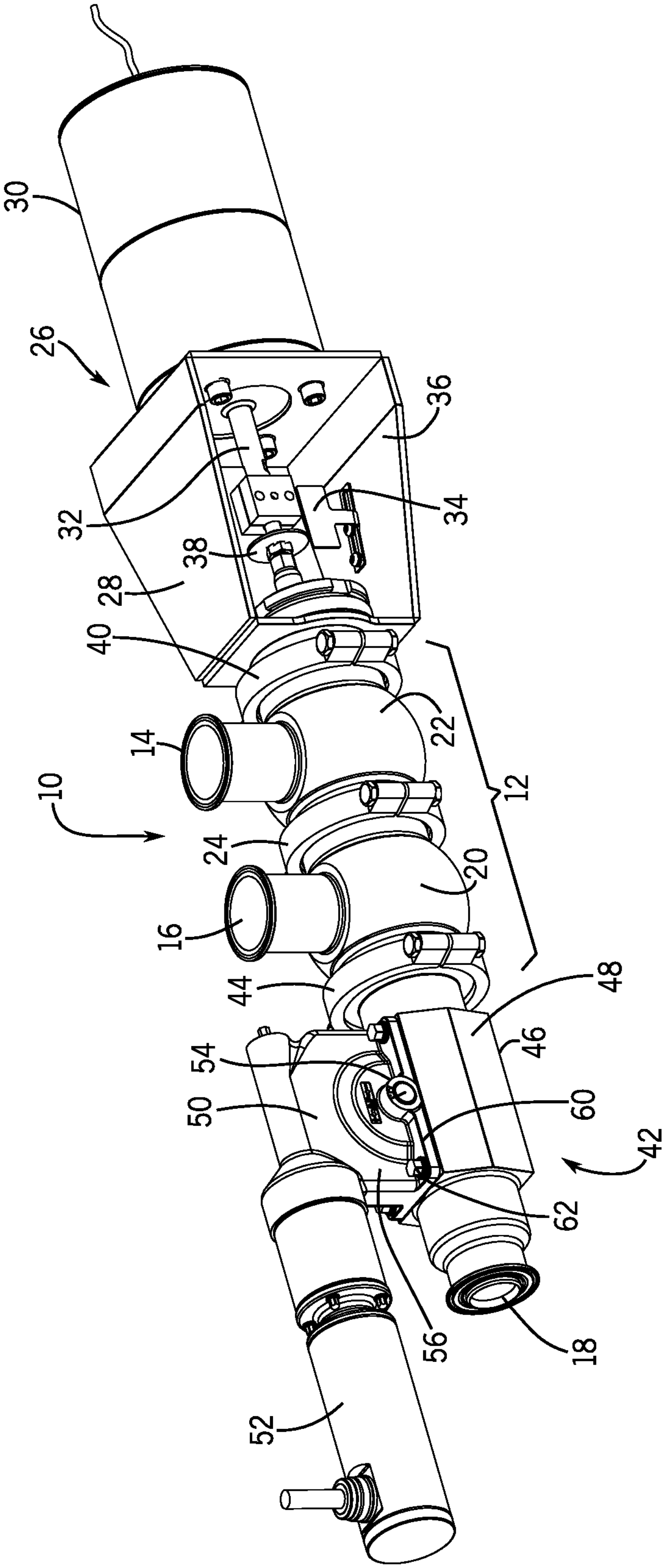
FIG. 1 is a perspective view of a steam injection heater incorporating the features of the present disclosure.

FIG. 1 illustrates a direct contact steam injection heater 10 constructed in accordance with the present disclosure. The heater 10 generally includes a supply body 12 that receives both a product to be heated and a supply of steam that provides the heating for the product. As an example, the product could be a slurry including a food product, a slurry including a non-food product or a food or non-food liquid that needs to be heated. The supply body 12 includes a steam inlet 14 and a product inlet 16 located downstream from the steam inlet 14 that provide connections for both the steam and product to enter into the supply body 12 from separate supply sources. After the product flow is heated, the heated product flow exits the steam injection heater 10 at a product outlet 18 for further processing.

In the embodiment illustrated in FIG. 1, the product inlet 16 is formed as part of a first inlet body 20 while the steam inlet 14 is formed as part of a second inlet body 22. The first and second inlet bodies are joined to each other by a clamp ring 24. The first and second inlet bodies 20, 22 are designed as identical components that each include an inlet for receiving either the steam or product flow. In an embodiment in which the heater 10 is a sanitary heater, both of the inlet bodies 20, 22 are formed from a stainless steel material, although other materials are contemplated as being within the scope of the present disclosure.

The supply body 12 is connected to a steam regulator assembly 26 that is operable to control the amount of steam that mixes with the product flow in a downstream combining tube. The steam regulator 26 includes a support housing 28 that provides support for a steam plug actuator 30 that is operable to control the position of a stem 32 that includes a steam nozzle mounted within the second inlet body 22. The steam plug actuator 30 controls the movement of the steam plug stem 32 to control the amount of steam that flows into the product flow to control the amount of heat and shear imparted by the steam injection heater 10. In the embodiment shown in FIG. 1, an indicator 34 is mounted to one of the side plates 36 such that the movement of the indicator disc 38 attached to the stem 32 provides a visual indication of the position of the steam plug within the second inlet body 22.

The steam plug actuator 30 can be one of a variety of different components that controls the movement and position of the stem 32 utilizing different control and mechanical actuators to move the stem 32. As an example, the steam plug actuator 30 could include a drive motor for moving the steam plug stem 32 to control the position of the steam plug within the supply body. In this example, an internal control unit would control the operation of the drive motor to adjust the position of the steam plug as desired. As an alternative example, the steam plug actuator could include an internal bladder connected to a supply of air pressure such that the pressure difference on each side of the internal bladder controls the movement of the stem 32.

In the embodiment illustrated in FIG. 1, the steam regulator 26 is attached to the second inlet body 22 by a clamp ring 40 that is similar to the clamp ring 24. The clamp rings 24 and 40 allow the components of the steam injection heater 10 to be initially assembled and then later separated and cleaned as required.

The discharge end of the supply body 12 is connected to a combining tube assembly 42 that is securely connected to the discharge end of the first inlet body 20 by another similar clamp ring 44. The combining tube assembly 42 includes an internal combining tube that is movable within a combining tube housing 46. The combining tube housing 46 includes a center portion 48 that provides mounting support for a combining tube adjustment mechanism 50. The combining tube adjustment mechanism 50 is operable to adjust the position of an internal combining tube relative to the stationary combining tube housing 46. The combining tube adjustment mechanism 50 includes a drive motor 52 that is operable in both a forward and reverse direction to control the position of the combining tube within the combining tube housing 46. The adjustment mechanism 50 includes an external indicator 54 that provides a visual indication of the position of the combining tube within the combining tube housing 46. During operation, the position of the combining tube within the combining tube housing 46 controls the amount of product that enters into the combining tube and thus controls the heating and shear forces created during the heating and mixing of the steam and product within the combining tube.

Figure 2:
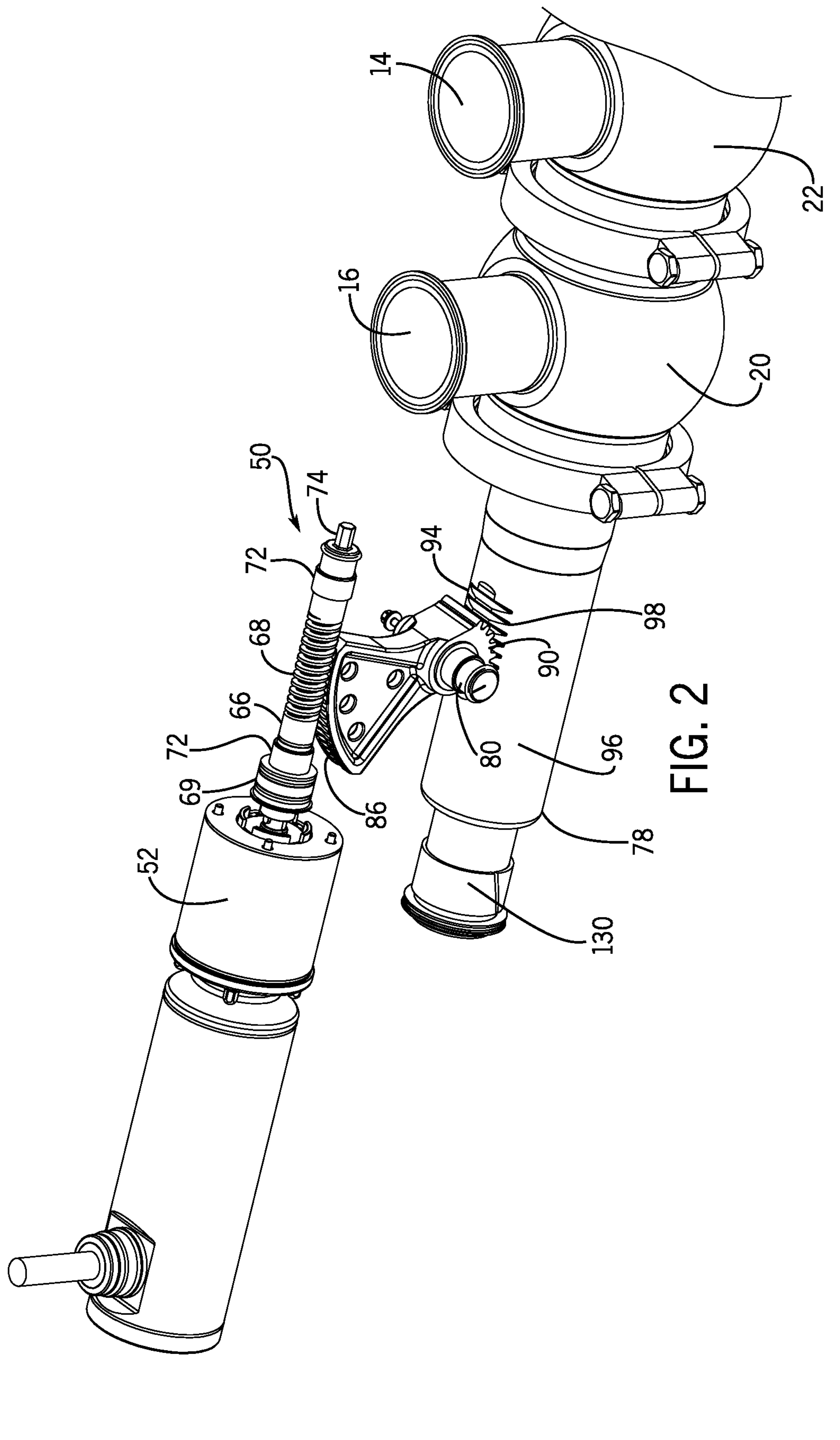
FIG. 2 is a perspective view of an adjustment mechanism for adjusting the position of a combining tube in the steam injection heater shown in FIG. 1.
Figure 3:
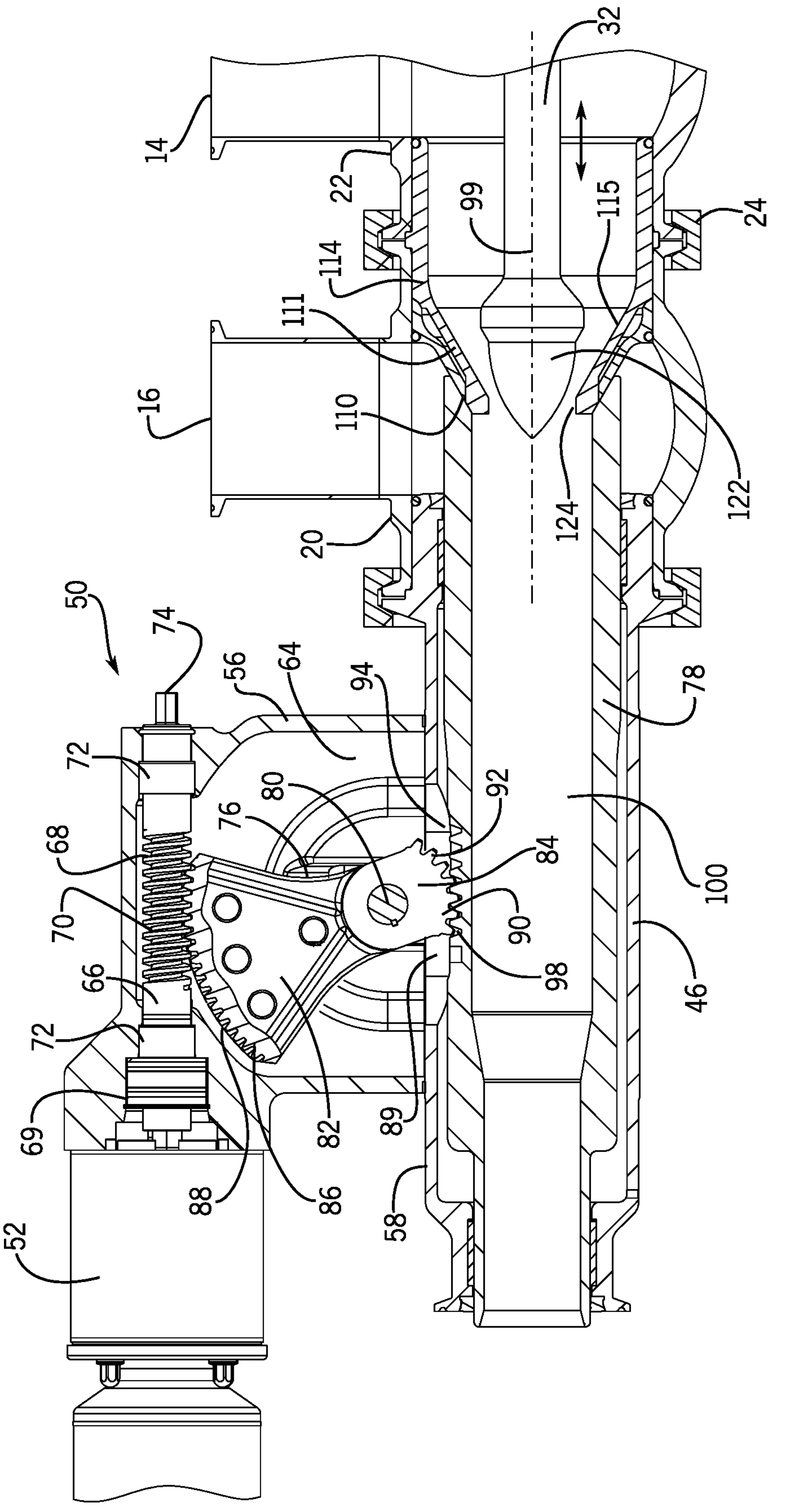
FIG. 3 is a section view showing the combining tube in a fully closed position.

The operation of the combining tube adjustment mechanism 50 will now be described with reference to FIGS. 2-4. As shown in FIG. 3, the adjustment mechanism 50 includes a drive housing 56 that is mounted to an outer surface 58 of the combining tube housing 46. As illustrated in FIG. 1, the drive housing 56 includes a support base 60 that is attached to the center portion 48 by a series of connectors 62. Although not shown in FIG. 1, a sealing gasket is positioned between the support base 60 and the center portion 48 to seal the internal cavity 64 shown in FIG. 3.

Referring now to FIG. 3, the drive housing 56 provides mounting support for the drive motor 52. The drive motor 52 can be one of multiple types of motors, such as an electric motor or a hydraulic motor. The drive motor 52 is operable in both a forward and a reverse direction. In the embodiment illustrated, the drive motor 52 is an electric servo motor that includes a drive shaft 66. The drive shaft 66 includes a worm gear portion 68 having a continuous helical thread 70. The drive shaft 66 is supported within the drive housing 56 by a linear thrust bearing 69 that dissipates any thrust loads and pair of rotary bearings 72 are designed to take up any radial loads and provide smooth movement in either rotary or linear directions. The bearings allow the drive shaft 66 to freely rotate within the drive housing 56. A manual actuation end 74 extends from the drive housing to allow manual rotation of the drive shaft 66 if needed.

In addition to the drive motor 52 and the drive shaft 66, the adjustment mechanism 50 further includes a lever arm 76 designed to transfer the rotating movement of the drive shaft 66 to linear movement of the combining tube 78. The lever arm 76 is pivotally mounted within the open internal cavity 64 by a pivot rod 80 that extends through the internal cavity 64 of the drive housing 56. The pivot rod 80 allows the entire lever arm 76 to pivot as a result of the operation and rotation of the drive shaft 66 in either a first or a second direction.

The lever arm 76 includes a first end 82 and a second end 84 that are located on opposite sides of the pivot point defined by the pivot rod 80. The first end 82 includes a drive surface 86 that is formed as a curved outer surface having a series of spaced teeth 88 sized to engage the helical thread 70 formed on the drive shaft 66. The curved drive surface has a radius of curvature that allows the drive surface 86 to remain in contact with the drive shaft 66 as the lever arm 76 pivots about the pivot rod 80. The spacing between the teeth 88 on the drive surface 86 corresponds to the spacing between the flights on the helical thread 70 on the worm gear portion of the drive shaft such that rotation of the drive shaft 66 results in movement of the drive surface 86 along the worm gear portion 68 of the drive shaft 66.

As can be understood in FIG. 3, the rotation of the drive shaft 66 causes the lever arm 76 to pivot about the pivot rod 80 in a direction dictated by the direction of rotation of the drive shaft 66. During this pivoting movement of the lever arm 76, an engagement surface 90 on the second end 84 of the lever arm 76 moves in a direction opposite the movement of the drive surface 86. The physical configuration of the lever arm 76 creates a mechanical advantage multiplier for the engagement surface 90 relative to the drive surface 86. The mechanical advantage multiplier depends upon the size of the drive surface 86 relative to the engagement surface 90, as well as on the lengths of the first end 82 and the second end 84 from the pivot point defined by the pivot rod 80. The lever arm 76 transfers the rotary movement of the drive shaft 66 to linear movement and magnifies the input load to higher output forces.

As illustrated in FIG. 3, the second end of the lever arm extends through an access opening 89 formed in the combining tube housing 46 such that the second end 84 of the lever arm 76 can contact the combining tube 78. The access opening 89 is sized to allow the full range of movement of the second end of the lever arm 76 during operation of the drive motor and the resulting movement of the drive surface 86. As shown, the engagement surface 90 contained on the second end 84 of the lever arm 76 includes a series of spaced teeth 92 that engage a rack 94 formed on an outer surface 96 of the combining tube 78. The rack 94 is formed as a flat area on the outer surface 96 of the combining tube 78, as is best shown in FIG. 2. The rack 94 can either be directly formed as a flat portion of the outer surface 96 or can be a separate component that is secured to the outer surface. In either case, the rack 94 includes a generally planar top surface having a series of spaced teeth 98 that engage the corresponding spaced teeth 92 formed on the engagement surface 90 of the lever arm 76.

Figure 4:
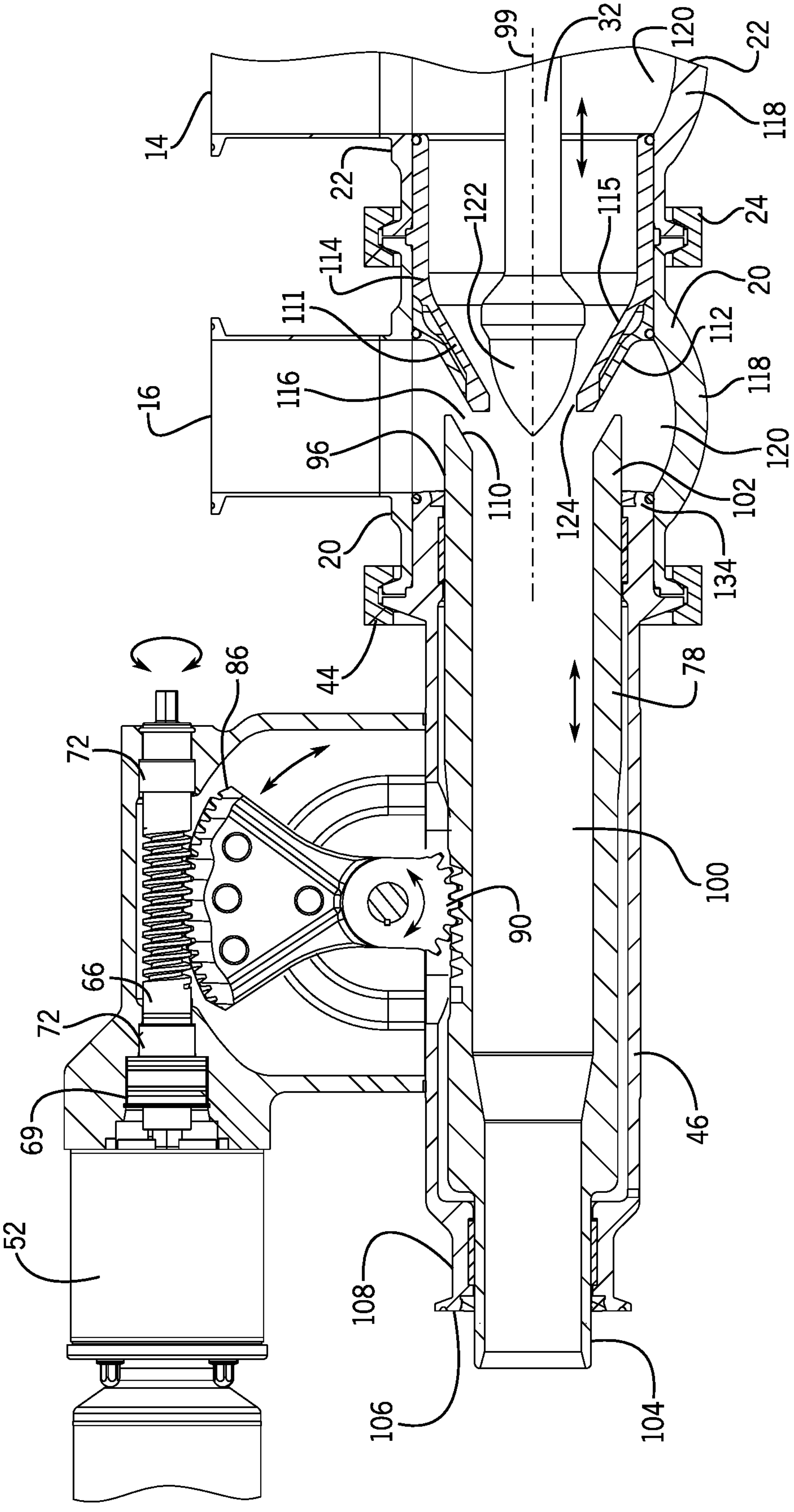
FIG. 4 is a section view similar to FIG. 3 showing the combining tube in a fully open position.

As can be understood in the comparisons of FIGS. 3 and 4, rotation of the drive shaft 66 results in corresponding linear movement of the combining tube 78 along a center axis 99 between the fully seated position shown in FIG. 3 and the fully retracted position shown in FIG. 4. The drive motor 52 can be operated to rotate the drive shaft 66 to move the combining tube 78 to desired and known positions between the fully seated position of FIG. 3 and the fully retracted position of FIG. 4. Since the size of the drive surface 86 is greater than the size of the engagement surface 90, the drive motor 52 can precisely control the location of the combining tube 78 in the combining tube housing 46 while minimizing input energy to adjust the position of the combining tube 78.

Referring now to FIGS. 3 and 4, the combining tube 78 is a tubular member centered along the center axis 99 and having a generally open interior 100 that provides an area for mixing the product flow and the steam flow in a conventional manner. The combining tube 78 extends between an upstream end 102 and a downstream end 104. The downstream end 104 extends past an end face 106 formed at the discharge end 108 of the combining tube housing 46. The upstream end 102 of the combining tube 78 includes a tapered inner end surface 110.

The supply body of the steam injection heater includes an internal steam nozzle 114 that is centered along the center axis 99 and is located at the connection between the first inlet body 20 and the second inlet body 22. The steam nozzle 114 is designed to control the amount of steam that enter into and mixes with the product flow in the combining tube 78. The steam nozzle includes a tapered nozzle outlet wall 111 that has outer contact surface 112 and an inner surface 115.

The spacing between the inner end surface 110 of the combining tube 78 and the outer contact surface 112 formed on a steam nozzle 114 defines a product flow gap 116. The product flow gap 116 is centered along the center axis 99 and can be adjusted by the linear movement of the combining tube 78, as can be seen in the comparisons of FIGS. 3 and 4. The size of the product flow gap 116 controls the amount of product that can flow into the interior 100 of the combining tube 78 from the product inlet 16. In the fully seated position shown in FIG. 3, the flow gap 116 is eliminated while FIG. 4 shows the maximum flow gap 116. During operation, the drive motor 52 can control the size of the product flow gap 116 and thus the amount of product flowing into the open interior of the combining tube 78.

As shown in FIGS. 3 and 4, the first inlet body 20 includes a curved outer wall 118 that allows the product to flow around the entire internal cavity 120 and thus pass through the entire flow gap 116 formed between the combining tube 78 and the steam nozzle 114. The curved outer wall 118 also helps to avoid product becoming trapped against or in any areas of the first inlet body 20.

As can be understood in FIGS. 3 and 4, the steam nozzle 114 includes a stem plug 122 that is mounted on the downstream end of the stem 32. As discussed previously, the stem 32 is movable along the center axis 99 in the direction shown by the arrows in FIGS. 3 and 4 to control the distance between the stem plug and the inner surface 115 of the steam nozzle 114. The gap between the stem plug 122 and the inner surface is centered along the center axis 99 and controls the pressure of the steam that passes through the steam outlet 124 and into the open interior 100 of the combining tube 78. The shape of the outer surface of the stem plug 122 thus controls the size of the steam outlet 124 to control the pressure of steam that enters into the combining tube. The second inlet body 22 includes the same curved outer wall 118 that creates a consistent pressure distribution around the entire steam outlet 124. The pressure of steam entering into the combining tube controls the amount of shear forces on the product flow in the combining tube.

As can be understood above, the stem plug 122, steam nozzle 114 and the combining tube 46 are all centered along the center axis 99 and are thus all concentric with each other. The concentricity of these components insures that the steam outlet 124, the product flow gap 116, the open interior 100 of the combining tube 46, the inlet and outlet of the combining tube 46 are all also concentric with each other, which enhances the operation of the direct contact steam injection heater.

Figure 5:
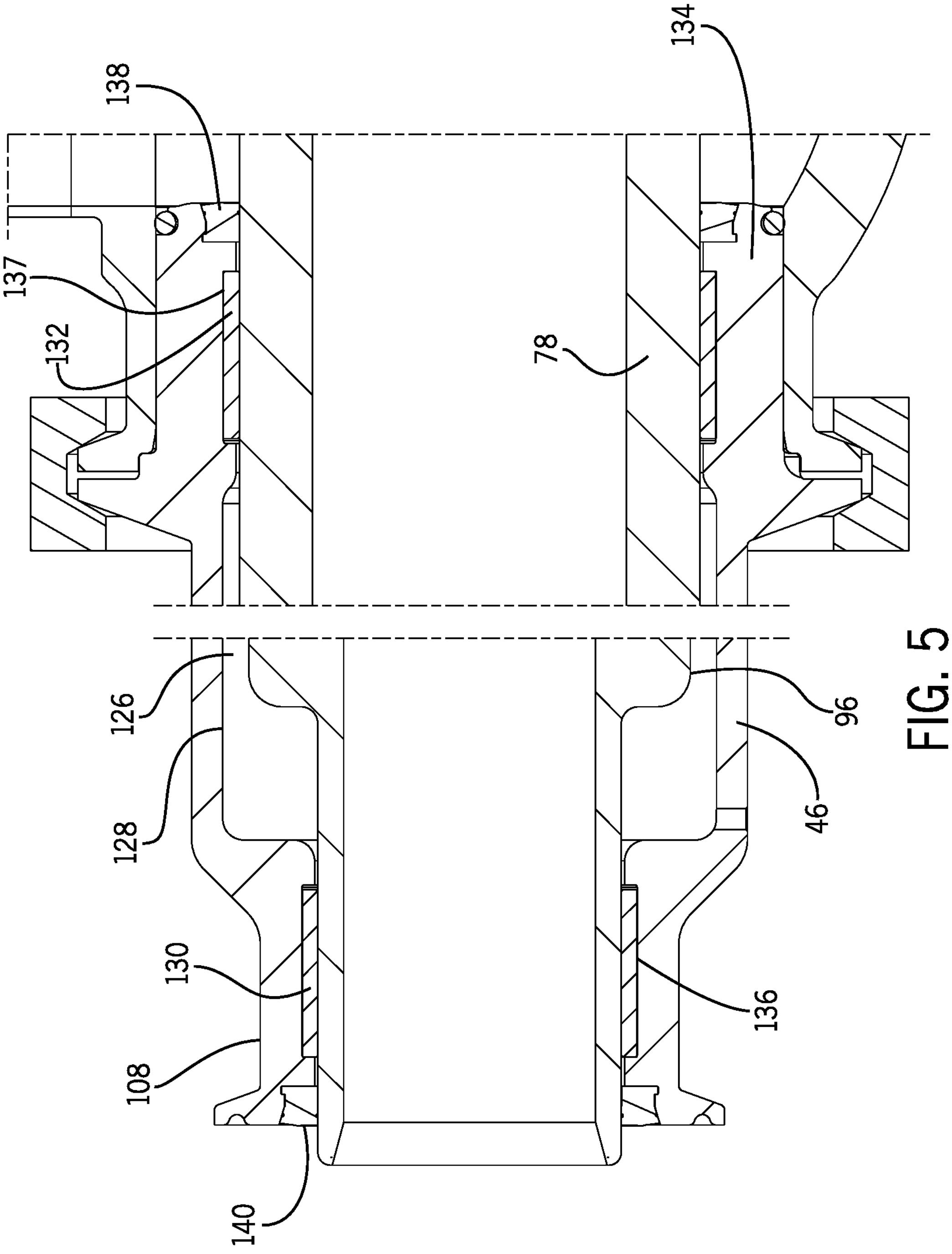
FIG. 5 is a magnified view showing the seals and bushings that allow the movement of the combining tube.

Referring now to FIG. 5, the combining tube 78 is suspended within the combining tube housing such that an air gap 126 is created between the outer surface 96 of the combining tube 78 and the inner surface 128 of the combining tube housing 46. The air gap 126 allows the combining tube 78 to freely move in a longitudinal direction along the length of the combining tube housing 46 while preventing metal to metal contact between the two components. In the embodiment illustrated, a first linear bearing member 130 is located near the discharge end 108 of the combining tube housing 46 while a second linear bearing member 132 is located near the inlet end 134 of the combining tube housing 46. Both of the linear bearing members 130, 132 are strips of resilient material that are received within internal grooves 136, 137 formed along the inner surface 128 of the housing 45. The linear bearing members 130, 132 are preferably formed from a material such as a polytetrafluoroethylene (PTFE) based material, which is sanitary and also provides a smooth wear surface for the repeated movement of the combining tube 78 in the longitudinal direction. The thickness of the pair of linear bearing members 130, 132 create the required space between the metal surfaces of the combining tube and the combining tube housing to prevent wear to each of the components during extended use.

As can be seen in FIGS. 4 and 5, the inlet end 134 of the combining tube housing 46 is positioned in fluid communication with the internal cavity 120 formed in the first inlet body 20. Thus, the inlet end 134 must form a seal with the outer surface 96 of the combining tube 78 to prevent the passage of the product into the air gap 126 between the outer surface 96 of the combining tube 78 and the inner surface of the combining tube housing 46. Since the combining tube 78 is movable, a first sanitary seal assembly 138 is positioned between the inlet end 134 of the combining tube housing 46 and the outer surface of the combining tube 78 while a second sanitary seal assembly 140 creates a seal between the outer surface 96 of the combining tube and the inner surface at the discharge end 108 of the combining tube housing 46.

Figure 6:
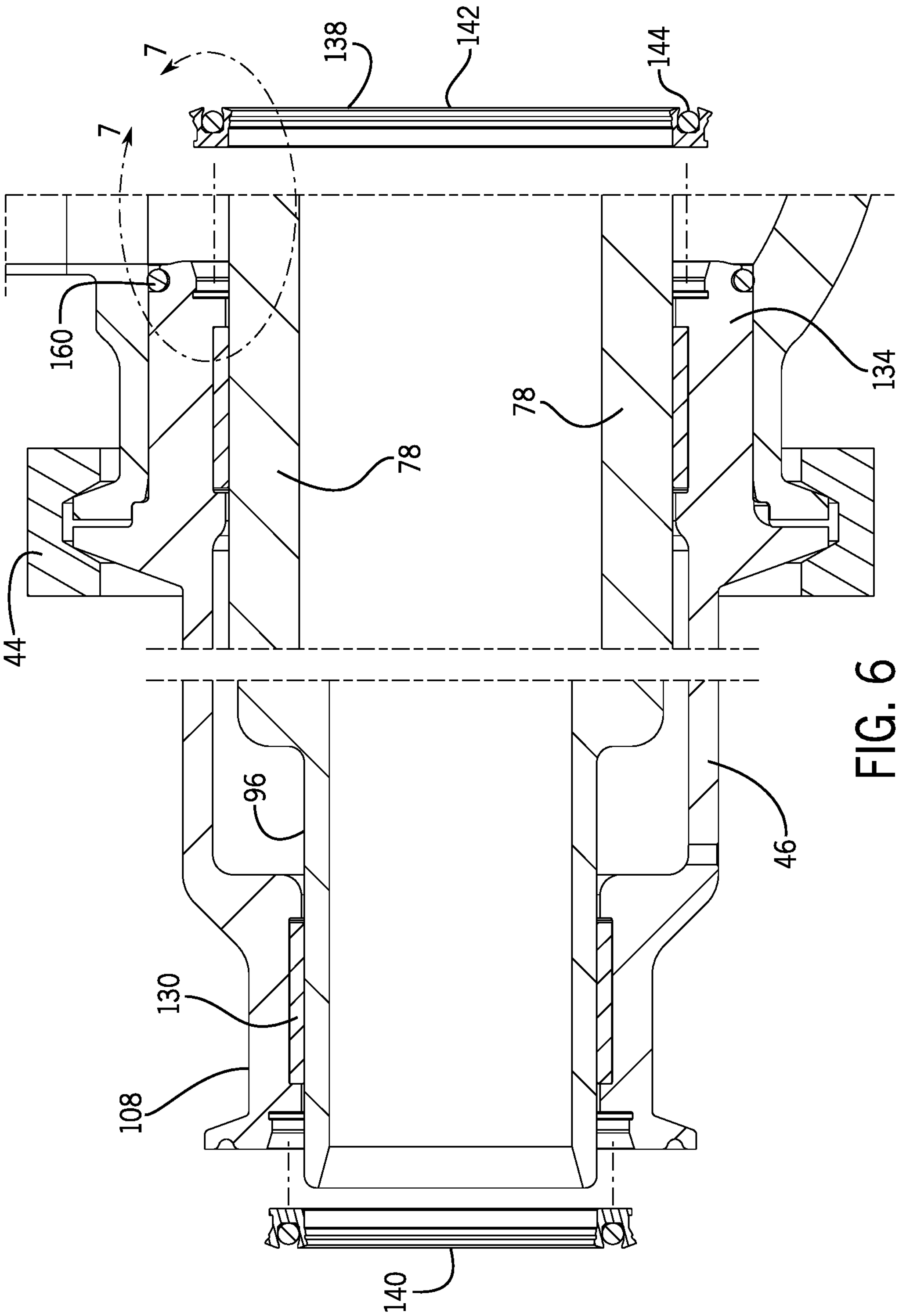
FIG. 6 is a magnified view showing the removal of one of the seal assemblies.
Figure 7:
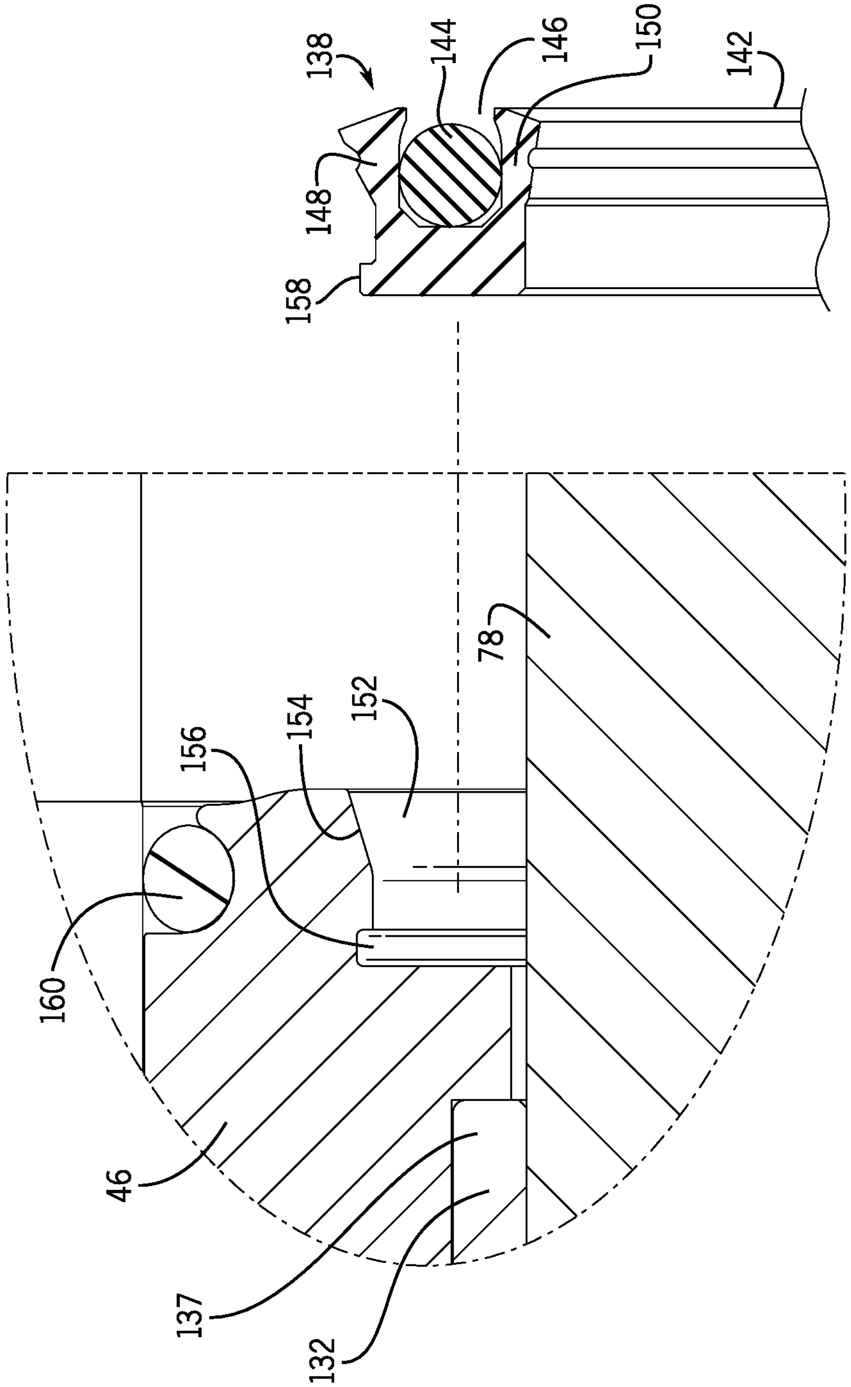
FIG. 7 is a magnified view of the seal assembly in a use position.

As shown in FIGS. 6 and 7, the first and second sanitary seal assemblies 138 and 140 are identical components and simply have a different inner diameter to seal with the different portions of the combining tube 78. The sanitary seal assemblies 138, 140 include an annular main body 142 that receives a bias member 144. In the embodiment illustrated, the bias member 144 is an O-ring formed from a resilient rubber material. The bias member 144 is received within an internal cavity 146 formed between an outer lip 148 and an inner wall 150 of the main body 142. The bias member 144 is compressed when it is inserted into the cavity 146 such that the bias member 144 exerts outward forces on both the outer lip 148 and the inner wall 150.

As shown in FIG. 7, the combining tube housing 46 includes a receiving cavity 152 that is formed in the solid wall of the combining tube housing 46. The receiving cavity 152 includes an angled side wall 154 that extends to a recessed retaining groove 156. The retaining groove 156 receives a protruding ridge 158 on the main body 142 when the main body 142 is pressed into the receiving cavity 152. Thus, when the sanitary seal assembly 138 is pressed into the groove 152, the ridge 158 is pressed into the retaining groove 156 to securely retain the sanitary seal assembly 138 in its use position. As the combining tube 78 moves relative to the stationary combining tube housing 46, the press fit between the retaining ridge 158 and the retaining groove 156 prevents separation of the sanitary seal assembly 138 from the combining tube 46. In the use position, the bias member 144 urges both the outer lip 148 and the inner wall 150 outward to create the desired seal between the moving combining tube 78 and the stationary combining tube housing 46.

As illustrated in FIG. 7, an O-ring 160 is used to create another seal between the combining tube housing and the supply body.

In the exemplary embodiment shown in the drawing figures, the body of the sanitary seals 138 and 140 are formed from a hard polymer material that resists wear during dynamic movement of the combining tube. The bias member creates the required resilient energizing force to create the seal between the polymer of the main body and the moving combining tube and stationary combining tube housing.

What is claimed is:

1. A direct contact steam injection heater, comprising:

a supply body having a steam inlet, a product inlet and a steam nozzle including a movable stem plug located downstream from the steam inlet;

a combining tube having an upstream end, a downstream end and an outer surface extending therebetween, wherein the upstream end is spaced from the steam nozzle and is movable to adjust the spacing between the upstream end and the steam nozzle, wherein the outer surface of the combining tube includes a rack having a series of spaced teeth;

a combining tube housing attached to the supply body for supporting the movement of the combining tube; and a combining tube adjustment mechanism including a lever arm having a first end and a second end having an engagement surface, the engagement surface including a series of spaced teeth that engage the series of spaced teeth on the rack on the outer surface of the combining tube, wherein pivoting movement of the lever arm of the combining tube adjustment mechanism creates linear movement of the combining tube within the combining tube housing.

2. The direct contact steam injection heater of claim 1 wherein the lever arm includes a drive surface on the first end having a series of spaced teeth and an engagement surface on the second end that includes the series of spaced teeth that engage the series of drive teeth on the rack.

3. The direct contact steam injection heater of claim 1 wherein the combining tube housing includes an inlet end and an outlet end, the combining tube being supported within the combining tube housing by a pair of linear bearings.

4. The direct contact steam injection heater of claim 1 further comprising a first sanitary seal assembly positioned between an inlet end of the combining tube housing and the outer surface of the combining tube and a second sanitary seal assembly positioned between an outlet end of the combining tube housing and the outer surface of the combining tube.

5. The direct contact steam injection heater of claim 4 wherein the first and second sanitary seal assemblies each includes a main body having a cavity defined by an outer lip and an inner wall and a bias member received in the cavity, wherein the bias member exerts a bias force to separate the outer lip and the inner wall.

6. The direct contact steam injection heater of claim 1 further comprising a drive motor having a drive shaft including a worm gear portion having a helical flight that engages a drive surface formed on the first end of the lever arm such that rotation of the drive shaft by the drive motor pivots the lever arm about a pivot point.

7. The direct contact steam injection heater of claim 6 further comprising a drive housing mounted to the combining tube housing, wherein the lever arm is pivotally mounted within the drive housing and the drive shaft is rotatably mounted within the drive housing.

8. The direct contact steam injection heater of claim 6 wherein the lever arm is mounted to a pivot shaft between the first end and the second end, wherein a distance from the drive surface to the pivot shaft is greater than a distance from the engagement surface to the pivot shaft.

9. The direct contact steam injection heater of claim 1 wherein the combining tube housing includes an access opening that receives the second end of the lever arm and is sized to allow pivoting movement of the second end of the lever arm.

10. A direct contact steam injection heater, comprising:

a supply body having a steam inlet, a product inlet and a steam nozzle including a movable stem plug located downstream from the steam inlet;

a combining tube having an upstream end, a downstream end and an outer surface extending therebetween, wherein the upstream end is spaced from the steam nozzle and is movable laterally to adjust the spacing between the upstream end and the steam nozzle;

a combining tube housing attached to the supply body for supporting the lateral movement of the combining tube, the combining tube housing including an inlet end and an outlet end; and a first sanitary seal assembly positioned between the inlet end of the combining tube housing and the outer surface of the combining tube and a second sanitary seal assembly positioned between the outlet end of the combining tube housing and the outer surface of the combining tube, each of the first and second sanitary seal assemblies including a main body having a cavity defined by an outer lip and an inner wall and a bias member received in the cavity, wherein the bias member exerts a bias force to separate the outer lip and the inner wall.

11. The direct contact steam injection heater of claim 10 wherein the combining tube housing includes and inlet end and an outlet end, the combining tube being supported within the combining tube housing by a pair of linear bearings.

12. The direct contact steam injection heater of claim 10 wherein the first and second sanitary seal assemblies each include a retaining ridge extending from the main body and the inlet and outlet ends of the combining tube housings each include a receiving cavity sized to receive the main body, the receiving cavity including a retaining groove sized to receive and retain the retaining ridge such that the receiving cavity retains the main body during lateral movement of the combining tube.

13. The direct contact steam injection heater of claim 10 wherein the bias member is an O-ring formed from a resilient material.

14. A direct contact steam injection heater, comprising:

a supply body having a steam inlet, a product inlet and a steam nozzle including a movable stem plug located downstream from the steam inlet, wherein the steam nozzle and the movable stem plug are located on a center axis;

a combining tube having an upstream end, a downstream end and an outer surface extending therebetween, the outer surface including a rack having a series of spaced teeth, wherein the combining tube is centered along the center axis and is movable along the center axis to adjust the spacing between the upstream end and the steam nozzle;

a product flow gap located between the upstream end of the combining tube and the steam nozzle, wherein the product flow gap is centered along the center axis and is adjustable through movement of the combining tube to selectively control an amount of product flowing from the product inlet into the combining tube;

a combining tube housing attached to the supply body for supporting the movement of the combining tube along the center axis; and a combining tube adjustment mechanism including a lever arm having a first end and a second end having an engagement surface, the engagement surface including a series of spaced teeth that engage the spaced teeth of the rack included on the outer surface of the combining tube, wherein pivoting movement of the lever arm of the combining tube adjustment mechanism creates linear movement of the combining tube within the combining tube housing.

15. A direct contact steam injection heater, comprising:

a supply body having a steam inlet, a product inlet and a steam nozzle including a movable stem plug located downstream from the steam inlet, wherein the steam nozzle and the movable stem plug are located on a center axis;

a combining tube having an upstream end, a downstream end and an outer surface extending therebetween, the outer surface including a rack having a series of spaced teeth, wherein the combining tube is centered along the center axis and is movable along the center axis to adjust the spacing between the upstream end and the steam nozzle;

a product flow gap located between the upstream end of the combining tube and the steam nozzle, wherein the product flow gap is centered along the center axis and is adjustable through movement of the combining tube to selectively control an amount of product flowing from the product inlet into the combining tube;

a combining tube housing attached to the supply body for supporting the movement of the combining tube along the center axis; and a first sanitary seal assembly positioned between an inlet end of the combining tube housing and the outer surface of the combining tube and a second sanitary seal assembly positioned between an outlet end of the combining tube housing and the outer surface of the combining tube, each of the first and second sanitary seal assemblies including a main body having a cavity defined by an outer lip and an inner wall and a bias member received in the cavity, wherein the bias member exerts a bias force to separate the outer lip and the inner wall.

16. A direct contact steam injection heater, comprising:

a supply body having a steam inlet, a product inlet and a steam nozzle including a movable stem plug located downstream from the steam inlet;

a combining tube having an upstream end, a downstream end and an outer surface extending therebetween, wherein the upstream end is spaced from the steam nozzle and is movable laterally to adjust the spacing between the upstream end and the steam nozzle;

a combining tube housing attached to the supply body for supporting the lateral movement of the combining tube, the combining tube housing including an inlet end and an outlet end;

a combining tube adjustment mechanism that engages the outer surface of the combining tube, wherein the combining tube adjustment mechanism is operable to move the combining tube within the combining tube housing;

a first sanitary seal assembly positioned within a first receiving cavity formed at the inlet end of the combining tube housing and configured to contact the outer surface of the combining tube; and a second sanitary seal assembly positioned within a second receiving cavity formed at the outlet end of the combining tube housing and configured to contact the outer surface of the combining tube, wherein each of the first and second sanitary seal assemblies are biased into contact with the outer surface of the combining tube when the combining tube is received within the combining tube housing.

* * * * *